(12) United States Patent
George et al.

(10) Patent No.: US 6,644,546 B2
(45) Date of Patent: Nov. 11, 2003

(54) SYSTEM AND METHOD FOR ELECTRONIC CHECK CONVERSION AT A POINT-OF-SALE TERMINAL

(75) Inventors: John L. George, Springdale, AR (US); Jeffrey Alan Hayes, Fayetteville, AR (US); Mark Evans Raezer, Springdale, AR (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 10/038,033

(22) Filed: Jan. 2, 2002

(65) Prior Publication Data

US 2003/0121966 A1 Jul. 3, 2003

(51) Int. Cl.[7] .............................. G06F 17/60; G06K 5/00
(52) U.S. Cl. .......................... 235/379; 235/380; 705/42
(58) Field of Search ................................. 235/380, 379, 235/382, 375, 383, 449; 705/14, 40, 44, 18, 42, 50, 39

(56) References Cited

U.S. PATENT DOCUMENTS

| | | | |
|---|---|---|---|
| 4,172,552 A | | 10/1979 | Case et al. |
| 4,321,672 A | * | 3/1982 | Braun et al. ................... 705/42 |
| 5,053,607 A | | 10/1991 | Carlson et al. |
| 5,484,988 A | | 1/1996 | Hills et al. |
| 5,592,377 A | * | 1/1997 | Lipkin ........................... 705/42 |
| 5,613,783 A | | 3/1997 | Kinney et al. |
| 5,893,667 A | | 4/1999 | Kinney et al. |
| 6,085,977 A | | 7/2000 | James et al. |
| 6,098,053 A | * | 8/2000 | Slater ........................... 705/44 |
| 6,123,260 A | | 9/2000 | Menzenski |
| 6,129,273 A | | 10/2000 | Shah |
| 6,155,483 A | | 12/2000 | Chupka et al. |
| 6,164,528 A | | 12/2000 | Hills et al. |
| 6,243,689 B1 | * | 6/2001 | Norton ......................... 705/18 |
| 6,334,108 B1 | * | 12/2001 | Deaton et al. ................. 705/14 |
| 6,438,527 B1 | * | 8/2002 | Powar .......................... 705/40 |
| 6,516,302 B1 | * | 2/2003 | Deaton et al. ................. 705/14 |
| 2002/0178112 A1 | * | 11/2002 | Goeller et al. ................. 705/39 |

* cited by examiner

Primary Examiner—Thien M. Le
(74) Attorney, Agent, or Firm—J. Bruce Schelkopf; Bracewell & Patterson LLP

(57) ABSTRACT

An improved system and method of electronic check processing at an existing point-of-sale system. The system utilized to implement the present invention includes at least one point-of-sale (POS) terminal, a verification system, and an electronic settlement network. The POS terminal includes a printer, MICR scanner, and optical scanner. When a customer presents a check to pay for a transaction at the POS, the checker runs the check through an MICR scanner, which captures the MICR information from the check. The MICR information is forwarded to the verification system for approval of the check for ECC. Once the check is approved for ECC, the purchaser's contact information is scanned from the face of the check by the optical scanner, and the digitized contact information is utilized along with other information from the transaction to create an ECC Agreement slip, which is printed on the high speed receipt printer. The agreement slip includes a signature line for the purchaser sign. Once the purchaser signs the agreement slip, he returns the slip to the checker. The slip is retained by the retailer and handled for cash balancing similarly to a charge card slip. The point-of-sale terminal automatically voids the negotiable instrument prior to the instrument being returned to the purchaser to complete the transaction.

29 Claims, 6 Drawing Sheets

SYSTEM AND METHOD FOR ELECTRONIC CHECK CONVERSION AT A POINT-OF-SALE TERMINAL

BACKGROUND OF THE INVENTION

1. Technical Field

The present invention relates in general to point-of-sale systems, and in particularly, to processing a negotiable instrument utilizing a point-of-sale system. Still more particularly, the present invention relates to a method and system for efficiently processing a negotiable instrument via a point-of-sale system during a sale transaction.

2. Description of the Related Art

Although there are established methods for processing checks, electronic check processing is rapidly becoming an attractive alternative to the traditional processing of paper checks. Traditionally, a check is received from a purchaser as tender at a point-of-sale. Then, the check must be processed by the retailer and physically sent through a paper check clearing network. The paper check clearing network processes the check by requesting funds from the purchaser's account. The purchaser's bank approves or denies the request depending on whether or not the purchaser's account includes sufficient funds to complete the transaction. Finally, the check is physically returned to the purchaser. Traditional check processing methods are costly and time consuming, adding unwanted overhead to sometimes slim profit margins of the retail industry.

Numerous devices exist for processing checks electronically. For example, U.S. Pat. No. 6,164,528 discloses a system and method for effecting payments for point-of-sale purchases of goods and services paid from consumer funds secured in bank checking or depository accounts. Each sale or "transaction event" is an electronic and "paperless" event that eliminates the costly and time-intensive traditional check processing methods. The system utilizes a magnetic ink character recognition (MICR) reader and a point-of-sale terminal. The required customer information is read from the check, and a sales slip is printed, which includes the retail establishment information, amount of the transaction, and a section for the customer contact information. This contact information is manually completed by the customer at the point-of-sale. The customer signs the sales slip, authorizing the retail establishment to remove funds from the customer's account.

Generally, this process takes a substantial amount of time, unlike a cash transaction or credit card transaction. This is particularly because the customer's contact information has to be manually written. Other customer's are made to wait in line until the customer information is completed written down, and often customers avoid check out lines when they see a customer ahead of them pull out their check books to pay for their purchases. The longer time to complete processing each customer also leads to inefficiency in the check out process and loss of dollars. One solution to this problem to involves the utilization of check imaging printers; however the image files are very large and require significant point-of-sale system memory.

Although the current ECC practice is practical and ultimately more efficient than standard check payment procedures, it still requires (1) a long time for each customer to complete a payment transaction and/or (2) implementing the ECC process, which requires significant expense in acquiring new, sophisticated ECC to transmit and store check images. For smaller retail establishments and chains that have only small profit margins, the cost of purchasing new check out system to support ECC is prohibitive. Likewise, with larger retailers, the cost is multiplied by the number of check out required to support the larger numbers of customers. Additionally, because a great majority of the retail checkout hardware utilized by large retailers are older machines coupled to aging computer networks, adoption of the system and method disclosed in the aforementioned U.S. patent would require retailers to halt business transactions for a lengthy period while newer machines and systems are installed and tested. Replacing all retail checkout hardware for a large retailer would therefore be time consuming and cost prohibitive. Furthermore, a check imaging system forces the retailer to change the entire account balancing and record retrieval process.

The present invention thus recognizes that it would be desirable to provide an efficient electronic check conversion system at a point-of-sale by which processing of a negotiable instrument such as a check is completed without manual input of customer contact information or other transaction information. A method and system by which overall time of an ECC transaction is reduced would be a welcomed improvement. The invention further realizes that it would be desirable to provide more efficient ECC processing without incurring significant hardware and system costs for established retailers. The invention further realizes that it would be desirable to provide more efficient ECC without having to change the retailer's cash balancing and record retrieval processes. These and other benefits are provided by the invention described herein.

SUMMARY OF THE INVENTION

Disclosed is an improved system and method of electronic check processing at an existing point-of-sale system. The system utilized to implement the present invention includes at least one point-of-sale (POS) terminal, a verification system, and an electronic settlement network. The POS terminal includes a printer, MICR scanner, and optical scanner. When a customer presents a check to pay for a transaction at the POS, the checker runs the check through an MICR scanner, which captures the MICR information from the check. The MICR information is forwarded to the verification system for approval of the check for ECC. Once the check is approved for ECC, the purchaser's contact information is scanned from the face of the check by the optical scanner, and the digitized contact information is utilized along with other information from the transaction to create an ECC Agreement slip, which is printed on the high speed receipt printer. The agreement slip includes a signature line for the purchaser to sign. Once the purchaser signs the agreement slip, he returns the slip to the checker. The slip is retained by the retailer and handled for cash balancing similarly to a charge card slip. The point-of-sale terminal automatically voids the negotiable instrument prior to the instrument being returned to the purchaser to complete the transaction.

The entire process is completed with a traditionally POS system with only the addition of an optical scanner. Use of the optical scanner to scan the contact information and create a digitized image, which is later reproduced in the agreement saves a significant amount of time in the processing of the check payment. Also, the digitized image file is used only by the printer and is discarded after the purchaser's contact information is printed on the ECC Agreement slip. Thus, the requirement to transmit and store the digitized image file is eliminated.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides a system and method for improving the efficiency of electronic check conversion (ECC) processing at a point-of-sale terminal (POS). The invention provides improved efficiencies while utilizing the normal store balancing and audit procedures. Several implementation requirements for ECC are adhered to within the invention. These include: (1) accurate reading of a MICR line of a negotiable instrument (e.g., check); (2) qualification that the check is a personal check (i.e., not a business, government, or 3rd party check, etc.); (3) voiding of the check before returning it to the customer; (4) providing the customer with a copy of the agreement (although not necessarily a signed copy); (5) ensuring that the customer signs the agreement; and (6) allowing the purchaser 60 days after an item is posted to challenge the ACH transaction. The invention is thus implemented within the established rules of ECC transactions.

Figure 1A:
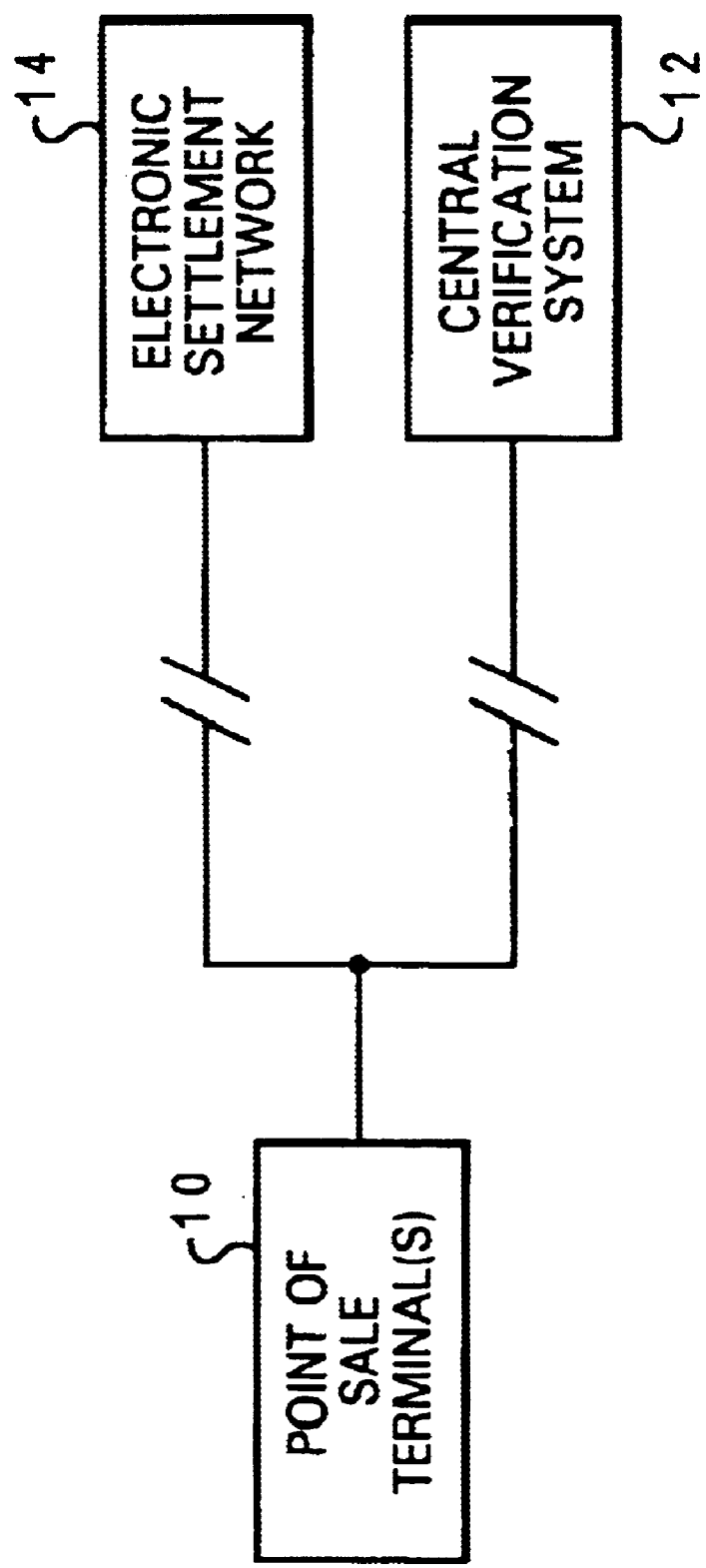
FIG. 1A illustrates a high-level block diagram of an exemplary point-of-sale system, which may be utilized to implement an illustrative embodiment of the present invention.

With reference now to the figures, and in particular, with reference to FIG. 1A, there is depicted an overall view of a system in which an illustrative embodiment of the present invention may be implemented. Point-of-sale terminal(s) 10 communicates with a central verification data processing system 12, herein referred to as "verification system" 12, which may be implemented as a retailer's host computer system. Point-of-sale terminal(s) 10 is connected to verification system 12, which is in turn connected to settlement network 14. During processing of a transaction, POS terminal 10 receives the contact and account information of a purchaser, and contacts verification system 12 to determine whether or not the purchaser's account is authorized for ECC. Various criteria may be utilized to authorize the transaction for ECC settlement. According to the illustrative embodiment, for example, ECC settlement may be applicable only for local banks and there may be a restriction on payroll checks and money orders, etc. If the purchaser's account is authorized for ECC settlement, point-of-sale terminal(s) 10 communicates information regarding the purchaser's account number and the amount to be debited to an electronic settlement network 14 to complete the debiting of the purchaser's account. This part of the processing occurs in the background similar to a credit card transaction and appears as an immediate approval and payment at the POS retail environment. The entire ECC process is described in greater detail below.

Implementation of the invention with current retail systems is completed with minimal changes to existing hardware. However, according to the illustrative embodiment, the invention utilizes an MICR printer/scanner that is enhanced with optical technology to provide higher accuracy MICR information. Any type of MICR printer/scanner may be utilized so long as it provides a low character substitution rate of the magnetic reader for accurate scanning capabilities. Also, according to the illustrative embodiment, a new optical scanner is provided to complete the scanning of contact information from the check as will become more clear below. Alternatively, a current printer/scanner may be modified to enable optical scanning of the address information off of the face of the check to create a digitized image. Notably, supporting software for this scanner is not required to provide Optical Character Recognition (OCR) as conversion of the digitized image of the contact information is not needed in the illustrative embodiment. That is, the invention only requires that the digitized image be reproduced in a clear enough manner to represent the contact information when printed.

Figure 1B:
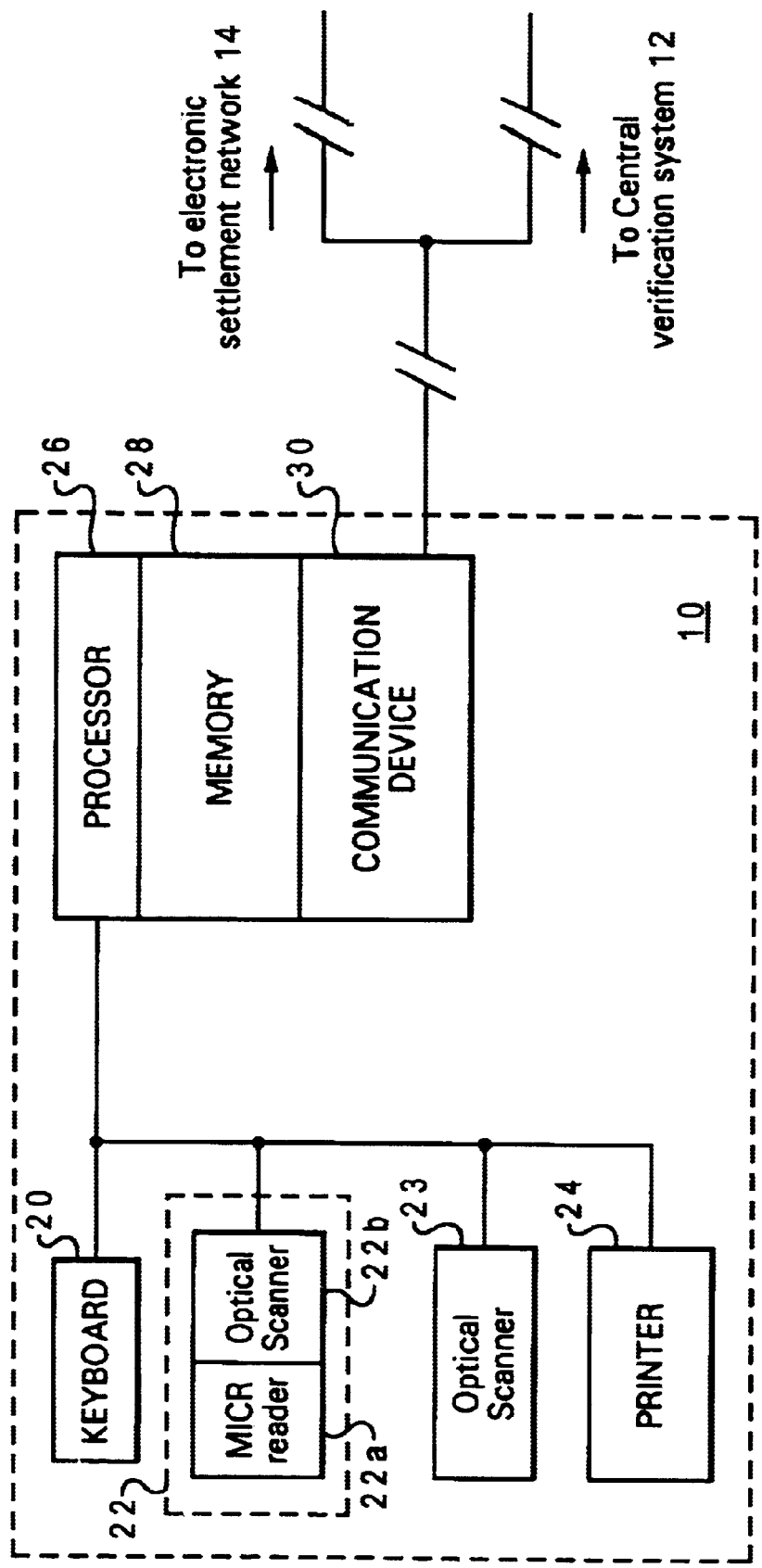
FIG. 1B depicts a high-level block diagram of a point-of-sale terminal in accordance with an illustrative embodiment of the present invention.

Referring now to FIG. 1B, there is illustrated a block diagram of point-of-sale terminal(s) 10 according to a preferred embodiment of the present invention. When a purchaser presents a negotiable instrument (e.g., check) as tender for a transaction, contact and account information for the purchaser may be entered into memory 28 utilizing register keyboard 20 or check reader 22. In line with one stated goal of the invention, the illustrative embodiment preferably utilizes check reader 22 to minimize overall processing time as utilization of keyboard necessarily involves additional time for a checker to enter check information.

Check reader 22 comprises at least two components: a magnetic ink character recognition (MICR) reader 22a and an optical scanner 22b. MICR reader 22a scans the negotiable instrument to retrieve the purchaser's account information. According to one embodiment, to ensure accuracy in the reading of the MICR line, the optical scanner 22b also reads the MICR line. Both the information read by the MICR reader 22a and the information read by the optical scanner 22b are analyzed by a software algorithm to determine a most accurate set of MICR numbers.

Then, optical scanner 22b captures the purchaser's contact information (e.g., address, phone number, and/or driver's license) presented on the face of the negotiable instrument by scanning the negotiable instrument. The calculation of a transaction total for items inputted via bar code reader (i.e., UPC scanner) or keyboard 20 of the register is utilized as a total amount required to complete the transaction at the point-of-sale system 10. Also, keyboard 20 may be utilized to enter information regarding the amount (e.g., a total value) owed by the purchaser to complete the current transaction. This total and all information scanned by check reader 22 is temporarily stored in the printer's memory 28. Storing the digitized image in the printer's memory eliminates the need to have the image transferred to and stored in system memory 28 and later transferred back to the printer. Processor 26 also relays the purchaser account information and the amount required to complete the transaction to verification system 12 via communication device 30, which may be implemented as any type of network coupling device such as a modem or an ethernet card, to determine whether the purchaser's negotiable instrument is authorized for the transaction. Printer 24 prints information scanned by optical scanner 22a and calculated total, etc., onto an agreement, as is described below in more detail.

Figure 2A:
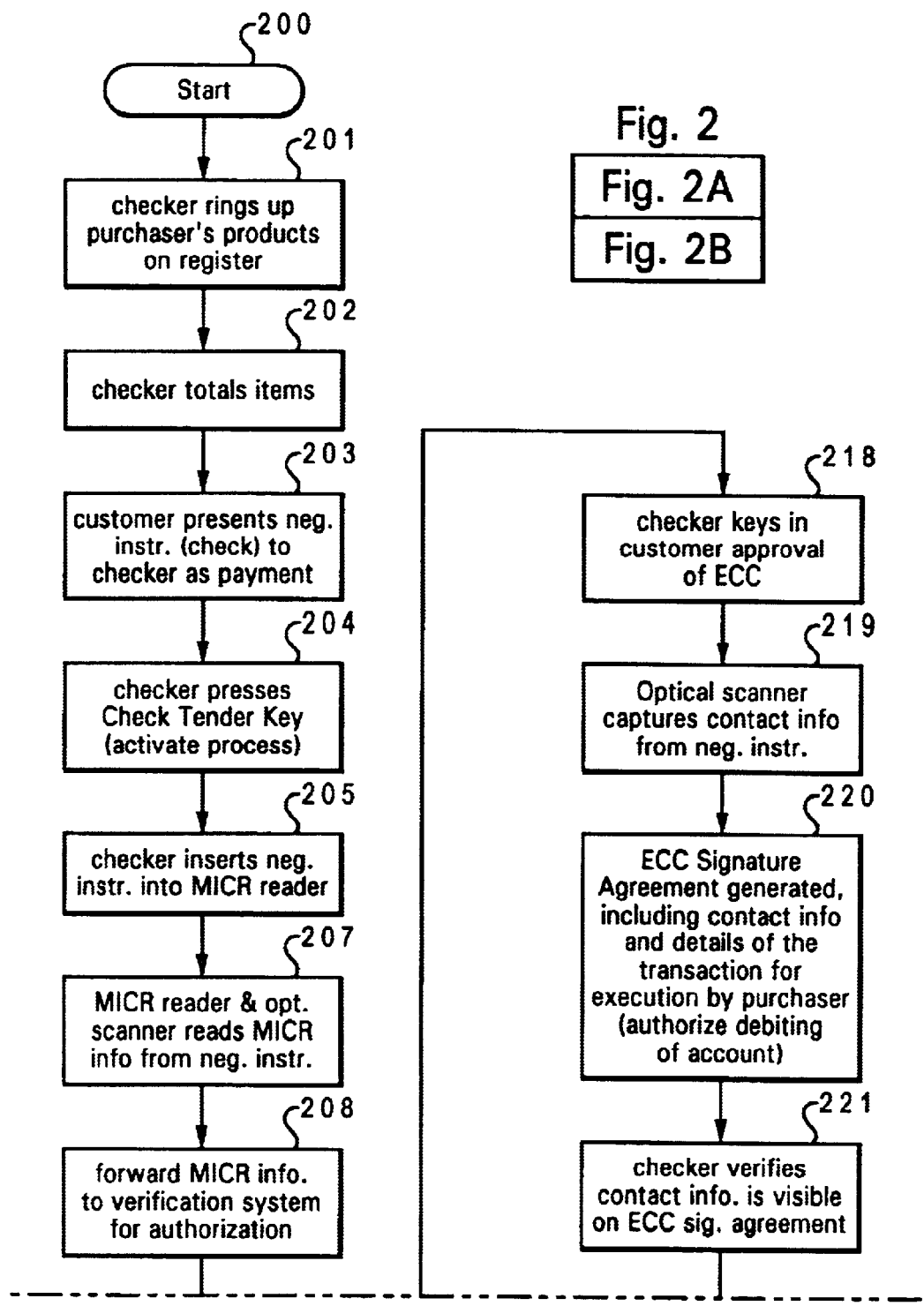
FIG. 2 illustrates a high-level logic flowchart depicting a method of processing a negotiable instrument at a point-of-sale system in accordance with an illustrative embodiment of the present invention.
Figure 2B:
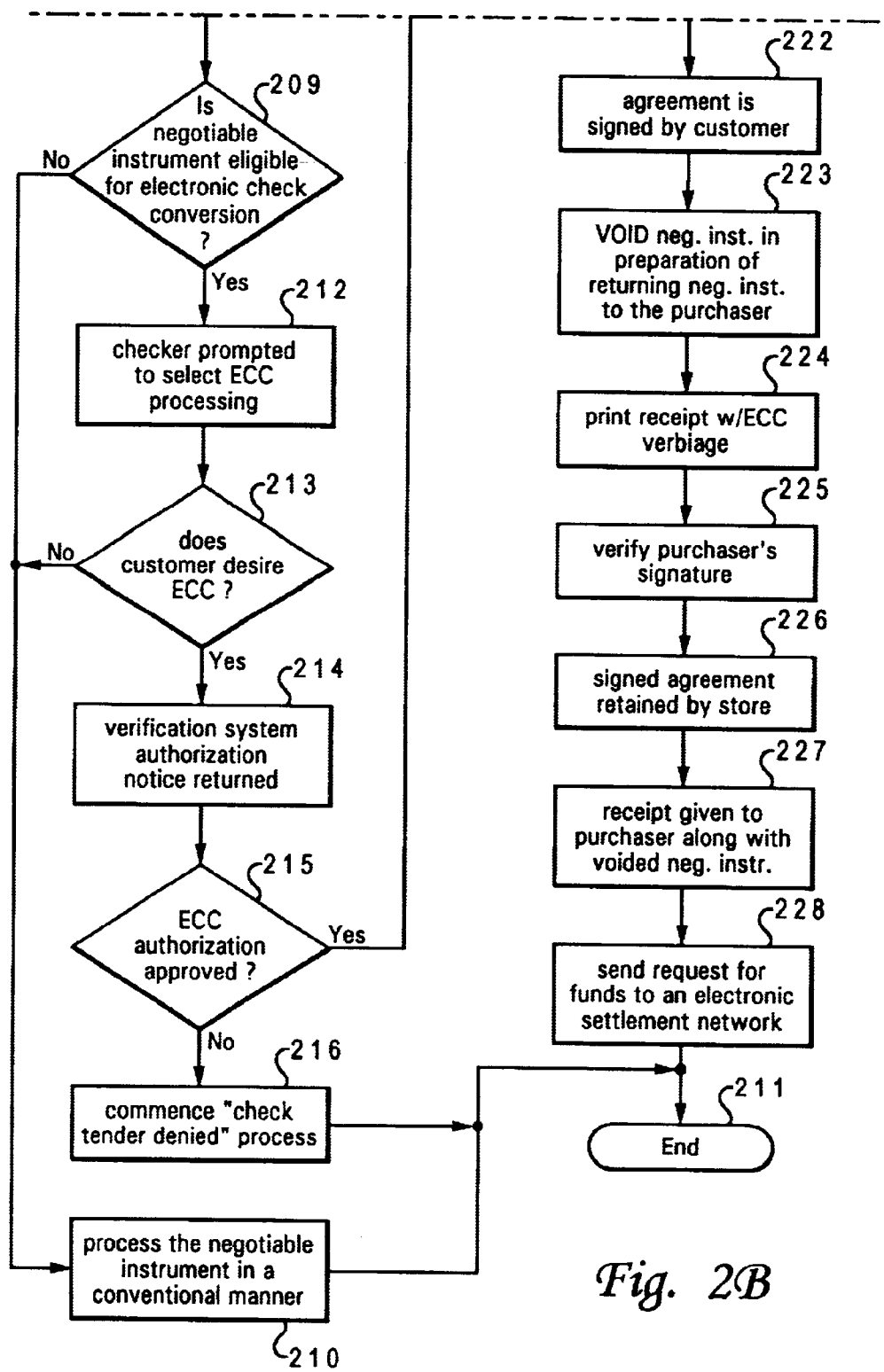

With reference to FIG. 2, there is depicted a high-level logic flowchart illustrating the method of processing a negotiable instrument at a point-of-sale terminal, which may be implemented utilizing a verification system, an electronic settlement network, and a point-of-sale terminal that includes a magnetic check scanner, a printer, and an optical scanner. The information scanned from a negotiable instrument presented at the point-of-sale enables the retailer to verify and debit a purchaser's account electronically while conforming to established check processing methods and systems utilized by the retailer. The process steps of FIG. 2 includes overlap of both human components (checker and purchaser) and electronic components (printer, scanner, verification system, etc.) to provide a big picture presentation of the complete processing of a negotiable instrument via ECC at the POS.

The method of the present invention begins at block 200, and continues to block 201 which depicts the commencement of a purchase transaction by which a checker rings up the customer's selected items on his register (POS terminal) by scanning their bar codes or manually inputting them on the keyboard. When the last item is rung up, the checker totals the items a shown at block 202, and then, as illustrated at block 203, the customer presents a negotiable instrument (i.e., check) to the checker as tender for the transaction. According to the illustrative embodiment, the printed check information contains all necessary data for completion of ECC and the customer does not have to manually fill out the check with the total and his signature. Then, as illustrated at block 204, the checker presses the Check Tender Key. This activates the process steps for handling a negotiable instruments provided by the invention as the system is probably unaware until that point whether the transaction will be paid for by cash, credit/debit, or check.

Following, the checker inserts the negotiable instrument into the check reader as depicted at block 205 to read the MICR line. The MICR line may be read via any reliable method available. According to the illustrative embodiment, the MICR line is read by a magnetic head and the optical scanner. The magnetic ink character recognition (MICR) reader and the optical scanner read the MICR line as shown at block 207. The MICR reader and optical scanner read the account information, which includes the account number, from the MICR field located at the bottom of the negotiable instrument. Both the information read by the MICR reader 22a and the information read by the optical scanner 22b are analyzed by a software algorithm to determine a most accurate set of MICR numbers. The acquired MICR information is then forwarded to the retailer's verification system for authorization as shown at block 208. This process may take a few seconds.

While the approval process is being undertaken by the verification system, a determination is made at block 209, whether the negotiable instrument is eligible for electronic check conversion (ECC). This is completed by the register application running on the processor, which determines from the MICR information whether the check meets the requirements for ECC. In the illustrative embodiment, only smaller personal checks are eligible for ECC (i.e., no large personal checks or business/company checks are eligible). If the negotiable instrument is not eligible for ECC, the negotiable instrument is processed in a conventional manner, as depicted in block 210, according to established policies of the retailer. Then, the process ends, as illustrated at block 211.

If, however, it is determined that the negotiable instrument is eligible for ECC, the checker is prompted to select ECC as indicated at block 212. The checker may select "Yes" or "No" although normal implementation of the invention may assume that the checker will always select Yes since this payment process is more efficient. Thus, according to another embodiment, the retailer may choose not to offer that choice to the customer and automatically submit the negotiable instrument via ECC. The checker then queries if the customer would permit the retailer to process the check as an ECC as depicted at block 213. This step assumes that the customers are familiar with ECC or that the retailer has previously advised the customers about the use of ECC.

In the illustrative embodiment, when a customer declines ECC, a note is automatically printed on the customer's receipt that explains how ECC works and the benefits of ECC (e.g., quicker check processing and thus faster check out times, etc.). Additionally, the retailer may have a phasing in period in which the customer is provided literature about ECC. Handling customer issues including educating customers about ECC are outside the scope of the invention and mentioned herein only to provide an indication of how the process by which customer approval may be received without the delay of having the checker verbally explain what ECC is to each customer.

Returning to FIG. 2, the verification system approval process returns as shown at block 214. The verification system approval process will likely return before or about the time the customer responds to the checkers query. A determination is then made as depicted at block 215, whether the verification system authorization has returned positive. If the verification system authorization is negative, the existing "check tender denied" process for standard check procedures are implemented as shown at block 216. Thus, if the check is not eligible for ECC or the customer chooses not to approve ECC or the verification system does not authorize the check payment, then the check is processed via the current retailer's check processing procedures, which typically entails manually writing the check, checking purchasers ID, and retaining the check for later collection of funds from the purchaser's bank.

Returning to block 214, if the verification system authorization is positive, the checker then keys in the customer's approval of ECC a shown at block 218. Then, as shown at block 219, the optical scanner automatically captures an image of a first indicia from the negotiable instrument. According to a preferred embodiment, the first indica is a set of contact and/or account information for the customer that is read directly from the negotiable instrument (e.g., the mailing address information from the check). In one embodiment, this process is completed in parallel with the MICR read if it does not negatively affect the speed of the MICR read operation. In the illustrative embodiment, the optical scanner is utilized to read the contact information and the processor stores the information in a temporary memory location (e.g., the printer's memory) in the point-of-sale terminal.

Following the capture of the information from the negotiable instrument, and as shown at block 220, an agreement is generated and the printer prints an "ECC Signature Agreement Slip" utilizing a thermal printer station, which operates very quickly. The ECC Signature Agreement Slip comprises some or all of the following information: store identification information such as number and address, transaction information (e.g., amount, date), ECC legal verbiage, digitized image of the customer's contact/address information, additional verbiage stating that the customer agrees to the transaction information and verifies that the contact/address information is correct, and a signature line. The purchaser's contact information is printed from the digitized image, which may be temporarily stored in the printer's memory. Notably, according to the illustrative embodiment, the digitized image file is used only by the printer and is discarded after the purchaser's contact information is printed on the ECC Agreement slip. Thus, the requirement to transmit and store the digitized image file is eliminated.

In the preferred embodiment, the agreement includes the purchaser's contact information and account information, the amount to be debited from the account, language authorizing ECC, and a field for the purchaser's authorization mark (i.e., signature). The purchaser's contact information allows the retailer to later contact the purchaser, which may be necessary if, for example, the purchaser's checking account does not include sufficient funds to cover the ECC approved total.

Figure 3A:
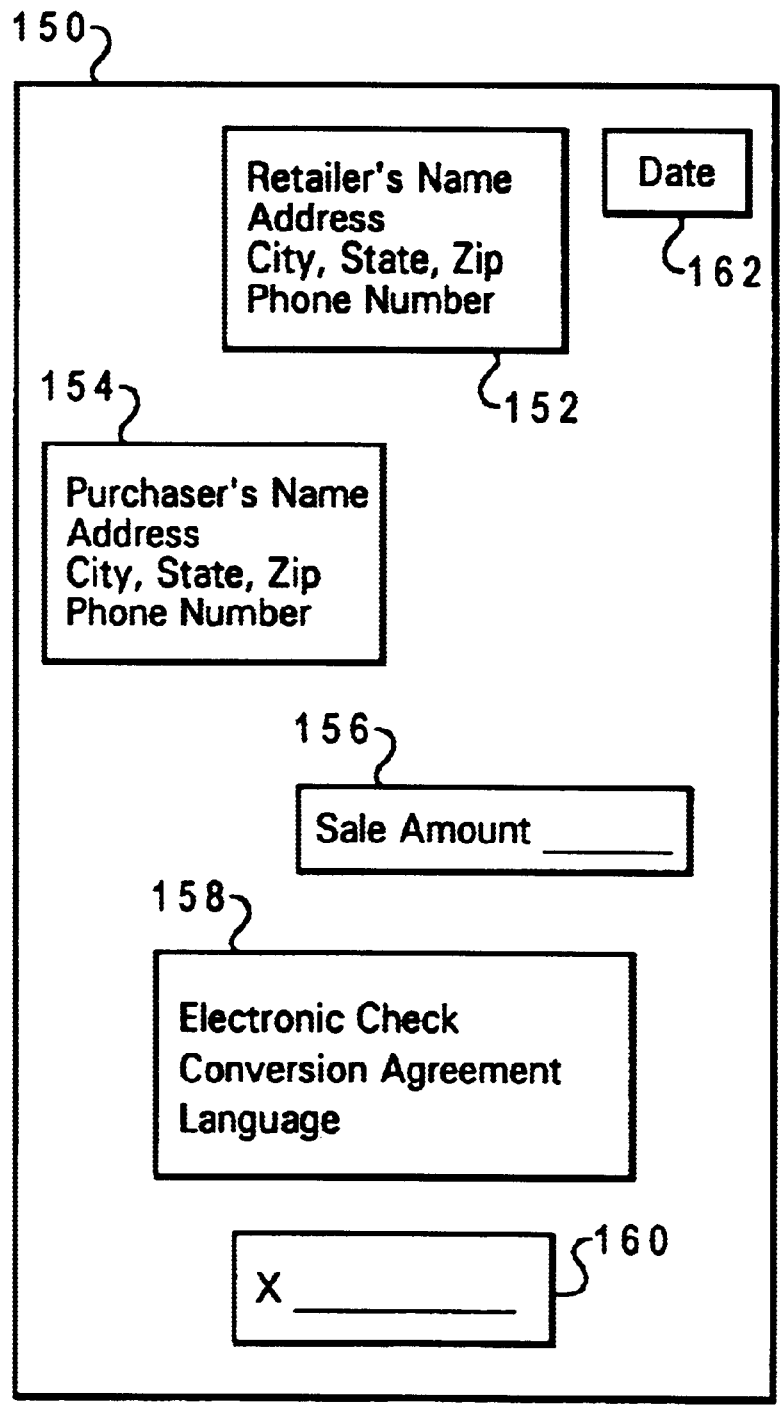
FIG. 3A depicts an agreement prepared by a printer at the point-of-sale terminal in accordance with an illustrative embodiment of the present invention.

Referring now to FIG. 3A, there is depicted a sample ECC signature agreement 150 utilized by the purchaser to authorize the electronic check conversion and the transfer of funds according to a preferred embodiment of the present invention. At the top of the agreement is the retailer's contact information 152, which may include a name, address, and phone number. Below retailer's contact information 152 is the purchaser's contact information 154, optically scanned by check reader 22 from the negotiable instrument and automatically printed on agreement 150 as a digitized image. The automatic printing results in increased efficiency at the point-of-sale. Previously, as disclosed in the prior art, the customer was required to manually write the purchaser contact information on the agreement. Also included is purchaser contact information 154, which allows the retailer to contact the purchaser in the event that the retailer encounters problems collecting on the ECC amounts. Sale amount 156 indicates the debit amount to be authorized by the purchaser. ECC agreement 158 discloses the terms of electronic check conversion. Finally, the purchaser's signature on signature line 160 indicates that the purchaser agrees to the terms of electronic check conversion and the transfer of funds.

Figure 3B:
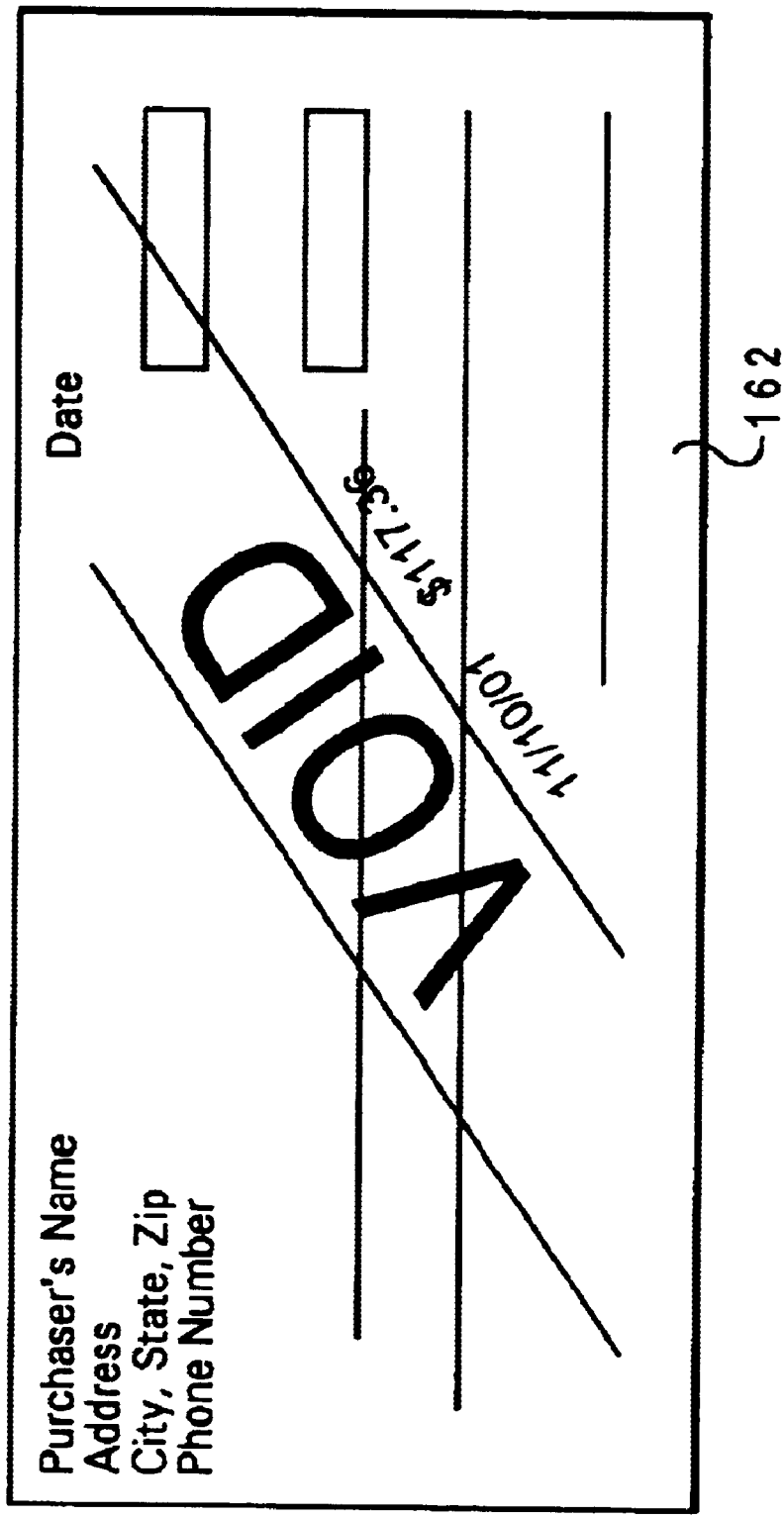
FIG. 3B illustrates a voided negotiable instrument after electronic check processing in accordance with an illustrative embodiment of the present invention.

Returning now to FIG. 2. Following the generation of the ECC Signature Agreement, the checker removes the ECC Signature Agreement slip from the printer and verifies that the customer contact/address information is clear/readable as shown at block 221. This is rather important in the process because the digitized image may occasionally be skewed if captured with a low resolution scanner, and the store has no other way of identifying and contacting the customer if something later goes wrong with collecting the ECC payment. Then, the checker hands the ECC Signature Agreement to the customer who then signs on the signature line as indicated at block 222. Of course the customer may first review the Agreement prior to signing it. While the process of having the customer sign the agreement is being undertaken, the printer automatically prints VOID across the face of the check as shown at block 223. Additionally, the printer may print some information about the transaction (e.g., date and total) for the customer's convenience when later reconciling his check book or purchases. FIG. 3B illustrates a voided negotiable instrument 162 according to one embodiment of the present invention. The check is then presented for removal by the checker. Meanwhile, the printer also prints a customer transaction receipt that includes a copy of the ECC verbiage as shown at block 224.

When the purchaser has completed signing the ECC Signature Agreement, the checker confirms that the signature on the ECC Agreement slip matches the customer name/address or information (or signature from a driver's license, etc.) printed on the agreement as depicted at block 225. The checker puts the signed ECC signature Agreement slip in the cash drawer as shown at block 226, and then as illustrated at block 227, the checker retrieves the voided check and transaction receipt from the printer and hands them to the customer. The secondary receipt may be printed with/without the payment information and is provided to the customer for his records. The ECC Agreement slip is retained by the retailer and handled for cash balancing similarly to a charge card slip. An electronic request for funds is generated and transmitted electronically to the settlement network as shown at block 228. Then, the process ends at block 211.

The signed printed receipt with the ACH agreement is placed in the cashier drawer and accounted for just like a check. The only difference is that the receipt does not have to be deposited into a local bank. The signed ACH agreement is retained by the merchant and used if the payment "bounces". The MICR number and transaction amount is transmitted to the bank electronically and no paper is sent through the clearing process.

As described above, the system and method for the electronic check conversion at a point-of-sale incorporates the benefits of electronic check conversion while utilizing existing check processing methods and systems. An optical scanner or a keyboard is utilized to enter a total value for a transaction. A negotiable instrument is presented by a purchaser as tender for a point-of-sale. A check reader scans a first indicia from the negotiable instrument and sends the scanned indicia to a verification system to determine whether or not the instrument is acceptable for ECC. If the instrument is acceptable, the point-of-sale terminal transmits an amount to an electronic settlement network to complete the debiting of the purchaser's account. Then, the point-of-sale terminal prints an agreement for execution by the purchaser, which authorizes the electronic check conversion and the completion of the transaction. Finally, the negotiable instrument is voided and returned to the purchaser as proof of the transaction.

Thus, many benefits are realized with the implementation of the invention over current methods. First, the process does not require large image files to be transmitted from the printer to the verification system and then to be stored by the host computer. Second, the paper ACH agreements may be easily stored similarly to the way journal tapes are stored and actual checks do not have to be deposited with the retailer's bank. Third, the electronic clearing process is much less expensive than the paper clearing process. Fourth, the disclosed process is faster/more efficient than the normal ACH process that prints the ACH agreement on the check because the customer can sign the receipt agreement while the check is being voided (otherwise, the time to sign the check adds to the total check-out time) and also because the customer does not have to manually write the contact information.

The invention thus accomplishes several goals in its implementation of ECC. Primary among these goals are those related to priority on throughput rate of customers during the checkout process. The corresponding decreases in checkout time could potentially generate substantial additional revenues or cost savings for retail stores given their daily check volumes. Additional goals achieved include: (1) implementing the process within the retailer's stated desire to avoid additional POS register peripheral devices; (2) Easily understandable process for customers; (3) Easily understandable process for retailer's store associates (including checkers, cash office, and others); (4) Fits retailer's existing store operations (e.g. cash drawer balancing operations, etc.); (5) Implementable on all existing retailer POS register configurations (e.g., 4683 loop to 4694 Ethernet); (6) Minimize the requirement for equipment upgrades (register, controller, DASD, etc.); (7) Supports migration to "SafeCheck" type solution if industry bypasses "ECC"; and (8) Allow eventual implementation of signature capture/slip elimination at the POS.

The invention provides more efficient check processing by retrieving the contact information from the check and the customer not having to write that information off as in current art. Further, the invention minimizes performance issues, system memory size and communication issues because there is no requirement to transmit and store image files, which are typically large. The current store balancing and financial processes are retained, but made easier since no forwarding of checks to the retailer's bank is required.

It is important to note that while the present invention has been described in the context of a fully functional data processing system, those skilled in the art will appreciate that certain elements of the method of the present invention are capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will also be understood by those skilled in the art that various changes in form and detail may be made therein without departing from the spirit and scope of the invention.

What is claimed is:

1. A system for electronic check conversion (ECC) at a point-of-sale, said system comprising:
   a point-of-sale (POS) terminal;
   a verification system electronically coupled to said POS terminal
   an electronic settlement network electronically coupled to said POS terminal and said verification system;
   means for receiving a total for a transaction at said POS terminal;
   means, responsive to a receipt of a negotiable instrument as tender for said transaction, for automatically reading at least a first indicia on said negotiable instrument, wherein said first indicia includes contact information of a purchaser associated with said transaction; and
   means for automatically preparing an agreement for execution by said purchaser, wherein said agreement includes a printed image of said first indicia and authorizes debiting an account associated with said negotiable instrument by said total value, wherein further, execution of said agreement by said purchaser completes said transaction.

2. The system of claim 1, wherein said means for automatically reading includes a scanner affiliated with said POS terminal.

3. The system of claim 2, wherein said POS terminal comprises a printer that prints said agreement and is triggered to void said negotiable instrument after said purchaser executes said agreement.

4. The system of claim 3, further comprising:
   means for reading a second indicia from said negotiable instrument;
   means for automatically transferring said second indicia to said verification system; and
   means for said verification system to check said second indicia against preestablished criteria.

5. The system of claim 4, wherein said means for said verification system to check said second indicia further includes:
   means, utilizing said second indicia, for determining whether said negotiable instrument is eligible for ECC; and
   means, in response to determining that said negotiable instrument is eligible for ECC, for processing said negotiable instrument according to ECC, wherein, when said negotiable instrument is not eligible for ECC, said negotiable instrument is processed in a conventional manner.

6. The system of claim 5, wherein said second indicia is a magnetic ink character recognition MICR, wherein further said means for reading includes an MICR reader of said POS terminal that reads MICR information from a face of said negotiable instrument and said scanner that reads an optical image of said MICR information, wherein further said means for reading further comprises means for determining a best representation of said second indicia based on an analysis of a representation from said MICR reader and a representation from said scanner.

7. The system of claim 3, further comprising:
   a printer memory; and
   a processing unit coupled to said printer memory that executes program code for:
      capturing said first indicia and storing an image of said first indicia within said printer memory;
      forwarding said image of said first indicia along with additional transaction data to said printer to generate said agreement; and
      activating said printer to void said negotiable instrument.

8. The system of claim 7, wherein said processing unit further executes program code for deleting said image of said first indicia after said agreement has been generated.

9. The system of claim 1, further comprising means for electronically printing a third indicia on said negotiable instrument in preparation for returning said negotiable instrument at said point-of-sale, said third indicia indicating that said negotiable instrument has been utilized to debit said total of said transaction at said point-of-sale.

10. The system of claim 9, further comprising means for automatically forwarding a request to debit an account associated with said negotiable instrument to said electronic settlement network.

11. The system of claim 1, wherein said negotiable instrument is a check.

12. A method of electronic check conversion (ECC) at a point-of-sale (POS) system that includes a point-of-sale (POS) terminal, a verification system, and an electronic settlement network, said method comprising:

receiving a total for a transaction at said POS terminal;

responsive to a receipt of a negotiable instrument as tender for said transaction, automatically reading at least a first indicia on said negotiable instrument, wherein said first indicia includes contact information of a purchaser associated with said transaction; and automatically preparing an agreement for execution by said purchaser, wherein said agreement includes a printed image of said first indicia and authorizes debiting an account associated with said negotiable instrument by said total value, wherein further, execution of said agreement by said purchaser completes said transaction.

13. The method of claim 12, wherein said automatically reading step includes scanning said first indicia utilizing a scanner affiliated with said POS terminal.

14. The method of claim 13, further comprising:

printing said agreement via a printer of said POS terminal; and triggering a voiding of said negotiable instrument via said printer after said purchaser executes said agreement.

15. The method of claim 14, further comprising:

reading a second indicia from said negotiable instrument;

automatically transferring said second indicia to said verification method; and checking said second indicia against pre-established criteria at said verification system.

16. The method of claim 15, wherein said checking step includes:

determining whether said negotiable instrument is eligible for ECC, utilizing said second indicia; and in response to determining that said negotiable instrument is eligible for ECC, processing said negotiable instrument according to ECC, wherein, when said negotiable instrument is not eligible for ECC, said negotiable instrument is processed in a conventional manner.

17. The method of claim 16, wherein said second indicia is a magnetic ink character recognition MICR information, wherein further said reading step includes:

reading said MICR information from a face of said negotiable instrument utilizing an MICR reader of said POS terminal and said scanner; and selecting a most precise representation of said second indicia based on an analysis of a representation from said MICR reader and a representation from said scanner.

18. The method of claim 14, wherein said ECC system further comprises a memory and a processing unit coupled to said memory, said method further comprising:

capturing said first indicia and storing said first indicia within said memory;

forwarding said first indicia along with additional transaction data to said printer to generate said agreement; and activating said printer to void said negotiable instrument.

19. The method of claim 12, further comprising electronically printing a third indicia on said negotiable instrument in preparation for returning said negotiable instrument at said point-of-sale, said third indicia indicating that said negotiable instrument has been utilized to debit said total of said transaction at said point-of-sale.

20. The method of claim 19, further comprising automatically forwarding a request to debit an account associated with said negotiable instrument to said electronic settlement network.

21. A computer program product, comprising:

a computer readable medium;

program instructions, encoded within said computer readable medium, for electronic check conversion (ECC) at a point-of-sale (POS) system that includes a point-of-sale (POS) terminal, a verification system, and an electronic settlement network, said program instructions including instructions for:

receiving a total for a transaction at said POS terminal;

responsive to a receipt of a negotiable instrument as tender for said transaction, automatically reading at least a first indicia on said negotiable instrument, wherein said first indicia includes contact information of a purchaser associated with said transaction; and automatically preparing an agreement for execution by said purchaser, wherein said agreement includes a printed image of said first indicia and authorizes debiting an account associated with said negotiable instrument by said total value, wherein further, execution of said agreement by said purchaser completes said transaction.

22. The computer program product of claim 21, wherein said program instructions for automatically reading includes instructions for scanning said first indicia utilizing a scanner affiliated with said POS terminal.

23. The computer program product of claim 22, further comprising instructions for:

printing said agreement via a printer of said POS terminal; and triggering a voiding of said negotiable instrument via said printer after said purchaser executes said agreement.

24. The computer program product of claim 23, further comprising instructions for:

reading a second indicia from said negotiable instrument;

automatically transferring said second indicia to said verification computer program product; and checking said second indicia against pre-established criteria at said verification system.

25. The computer program product of claim 24, wherein said program instructions for checking includes instructions for:

determining whether said negotiable instrument is eligible for ECC, utilizing said second indicia; and in response to determining that said negotiable instrument is eligible for ECC, processing said negotiable instrument according to ECC, wherein, when said negotiable instrument is not eligible for ECC, said negotiable instrument is processed in a conventional manner.

26. The computer program product of claim 25, wherein said second indicia is a magnetic ink character recognition MICR information, wherein further said program instructions for reading includes instructions for reading said MICR information from a face of said negotiable instrument utilizing an MICR reader of said POS terminal.

27. The computer program product of claim 23, wherein said ECC system further comprises a memory and a processing unit coupled to said memory, said computer program product further comprising program instructions for:

capturing said first indicia and storing said first indicia within said memory;

forwarding said first indicia along with additional transaction data to said printer to generate said agreement; and activating said printer to void said negotiable instrument.

28. The computer program product of claim 21, further comprising program instructions for electronically printing a third indicia on said negotiable instrument in preparation for returning said negotiable instrument at said point-of-sale, said third indicia indicating that said negotiable instrument has been utilized to debit said total of said transaction at said point-of-sale.

29. The computer program product of claim 28, further comprising program instructions for automatically forwarding a request to debit an account associated with said negotiable instrument to said electronic settlement network.

* * * * *